United States Patent [19]

Beck et al.

[11] 4,079,150

[45] Mar. 14, 1978

[54] ENSILING AGENT FOR FODDER PLANTS AND A METHOD OF FERMENTATING FODDER PLANTS

[75] Inventors: Theodor Beck, Munich; Friedrich Gross, Grub, both of Germany

[73] Assignee: Plate Kofasil Gesellschaft mit Beschrankter Haftung, Bonn, Germany

[21] Appl. No.: 758,709

[22] Filed: Jan. 12, 1977

[30] Foreign Application Priority Data

Jan. 24, 1976 Germany ............................. 2602626

[51] Int. Cl.$^2$ .............................................. A23K 3/03
[52] U.S. Cl. .................................... 426/54; 426/636; 426/321; 252/401
[58] Field of Search ........................ 426/52, 53, 54, 49, 426/335, 69, 532, 321; 260/248.5, 606; 252/401; 195/96

[56] References Cited

U.S. PATENT DOCUMENTS

| | | | |
|---|---|---|---|
| 3,443,956 | 5/1969 | Muller | 426/69 |
| 3,961,079 | 6/1976 | Hellberg | 426/54 |

FOREIGN PATENT DOCUMENTS

| | | | |
|---|---|---|---|
| 2,334,296 | 7/1973 | Germany | 426/54 |

OTHER PUBLICATIONS

Gross et al. "Comparative Investigations on the Effects of Various Silage Additives" Chemical Abstracts vol. 78 : 83056g 1973.

*Primary Examiner*—R. B. Penland
*Attorney, Agent, or Firm*—Donald D. Jeffery

[57] ABSTRACT

The invention provides an ensiling agent which contains, based on the total quantity of active ingredients, a mixture of from 50 to 90% by weight of salts of formic acid and from 10 to 50% by weight of hexamethylene tetramine or other compounds which slowly and continuously release formaldehyde during the fermentation of fodder plants.

The invention further provides a process for the fermentation of fodder plants in which from 0.1 to 0.5% by weight of an ensiling agent based on the weight of green fodder, is added to the material which is to be ensiled, the proportion of hexamethylene tetramine or other compounds which slowly and continuously release formaldehyde during fermentation, not exceeding 0.1% by weight, based on the weight of green fodder.

Such ensiling agents are useful for fermenting fodder plants, in particular these which are difficult to convert into silage.

8 Claims, No Drawings

ENSILING AGENT FOR FODDER PLANTS AND A METHOD OF FERMENTATING FODDER PLANTS

This invention relates to an ensiling agent for fodder plants and to a method of fermenting fodder plants which are difficult to convert into silage, using these ensiling agents.

The ensiling of fodder which is difficult to convert into silage, such as green fodder which is rich in protein or fodder which has been spoilt by rain, is carried out using ensiling agents to improve natural lactic acid fermentation and suppress harmful butyric acid fermentation. The use of effective ensiling agents prevents loss of fodder due to degradation of nutrients and prevents partial or complete spoilage due to faulty fermentation. The preserved green fodder obtained by natural or controlled lactic acid fermentation, with the aid of auxiliary agents in the form of powders or liquids, is known as silage.

Known ensiling agents include, for example, mixtures of nitrites and hexamethylene tetramine as described in German Offenlengungsschrift No. 2,158,946, mixtures of nitrates, hexamethylene tetramine and benzoic acid as described in German Offenlegungsschrift No. 2,335,253 and mixtures of paraformaldehyde and nitrite.

The use of a mixture of nitrite and hexamethylene tetramine does not always give completely satisfactory results as can be seen from the experiments reported in German Offengungsschrift No. 2,335,253. The use of sodium nitrite, particularly if present at relatively high concentrations in the mixture of active ingredients, involves the risk of toxic effects in animals and humans if incorrectly used. The use of a mixture of paraformaldehyde and nitrite as described in German Offenlegungsschrift No. 2,334,296 has substantially the same disadvantages as those of the use of hexamethylene tetramine and nitrite mentioned above. In addition, as a selective bacteriostatic agent in the preparation of fermented fodder, paraformaldehyde is to be rated as inferior to hexamethylene tetramine in that aldehyde is liberated very rapidly from paraformaldehyde but, from hexamethylene tetramine, it is liberated relatively slowly and continuously so that lactic acid fermentation is not inhibited.

It is also known that salts of formic acid added to fodder in conventional concentrations often have only a slight positive effect and in many cases even a deleterious effect on fermentation as described in Groß and Riebe, Garfutter, publishers Ulmer Verlag 1974.

It is an object of the present invention to provide an ensiling agent which is in a form in which it can be scattered or sprayed and administered in finely adjusted doses and which produces optimum conversion into silage when added in small quantities, the constituents of which are either physiologically completely harmless or completely broken down by the time the silage is administered as feed.

The invention therefore relates to an ensiling agent for fodder plants which, based on the total quantity of active ingredients, contains a mixture of 50 to 90% by weight of salts of formic acid and 10 to 50% by weight of hexamethylene tetramine or other compounds which slowly and continuously release formaldehyde during the fermentation of fodder plants.

In the process of fermentation of fodder plants according to the invention the mixture defined above is added to the material which is to be converted into silage in quantities of from 0.1 to 0.5% by weight, based on the weight of green fodder, provided that the proportion of hexamethylene tetramine or other compounds slowly and continuously releasing formaldehyde during the process of fermentation of the fodder plants does not exceed 0.1% by weight, based on the weight of green fodder.

In the process according to the invention, therefore, salts of formic acid, hereinafter referred to as formates, are added to the material which is to be converted into silage in a quantity of from 0.05 to 0.45% by weight. The upper limit of formate concentration is preferably about 0.3% by weight and the lower limit about 0.1% by weight. The quantity of hexamethylene tetramine or other compounds slowly and continuously releasing formaldehyde during the fermentation of fodder plants, referred to as "HMT" hereinafter, is consequently between 0.01 and 0.1% by weight since, as already indicated above, the HMT content should on no account exceed 0.1% by weight, based on the weight of green fodder. This means that if the mixture of active ingredients contains a very high proportion of HMT, e.g. 50% by weight, it must not be added in a greater quantity to the material which is to be converted into silage, 0.2% by weight in this example, than that which would result in the green fodder having the maximum HMT content of 0.1% by weight. The upper limit of HMT is preferably approx. 0.08% by weight and the lower limit approx. 0.02% by weight.

After numerous experiments carried out to effect conversion into silage and numerous microbiological investigations, it has now surprisingly been found that when the ensiling agent according to the invention is used and the process according to the invention is carried out, a powerful synergistic effect between the active ingredients is obtained. When formates are used alone, a suitable ensiling effect is obtained only at extremely high, uneconomic concentrations of about 1% by weight or more. Only a fraction of the quantity of formates is required when a mixture of formates and hexamethylene tetramine according to the invention is used. This synergistic effect of formates and hexamethylene tetramine on the unwanted fermentation microflora which give rise to faulty fermentation of foodstuffs is completely unexpected to the man of the art. As demonstrated by the comparison experiments described below, the mixture according to the invention produces an excellent effect, superior or at least equal to that of ensiling agents containing nitrite but completely without the harmful and undesirable effects of nitrite. The ensiling effect obtained with the mixture of active ingredients according to the invention can, in some cases, be slightly improved by the addition of nitrite but only at the expense of the disadvantages inherent in the use of nitrite already described above.

For economical reasons, the formate used according to the invention is preferably calcium formate because it is readily available as a commercial product.

The dependence of the synergism of the abovementioned ensiling agents upon the concentrations at which they are used can be seen clearly from a study of the development of the most important of the harmful fermentative bacteria, the butyric acid bacteria of the type *clostridium tyrobutyricum*, in the presence of one or more additives. The results of such culture experiments are summarised in Table 1.

Table 1

Synergistic action of Calcium formate, hexamethylene tetramine and sodium nitrite on the developmental inhibition of Clostridium tyrobutyricum (development of clostridium without additive = 100)

| Experiment | Ca-formate % by weight | Hexamethylene tetramine % by weight | Na-nitrite % by weight | % Clostridium growth |
|---|---|---|---|---|
| 1 | 0.2 | — | — | 95 |
| 2 | 0.5 | — | — | 20 |
| 3 | 1.0 | — | — | 2 |
| 4 | — | 0.025 | — | 55 |
| 5 | — | 0.050 | — | 20 |
| 6 | 0.2 | 0.025 | — | 5 |
| 7 | 0.2 | 0.050 | — | 2 |
| 8 | 0.2 | 0.025 | 0.05 | 2 |

The parts by weight given above indicate the quantity of individual active ingredients, based on the weight of green fodder in the material which is to be converted into silage.

The success of conversion into silage is measured by determining the following quantities:

(a) The level of nutrient loss is determined by measuring the quantity of fermentation gas formed as a result of breakdown of nutrients by fermentation and microbial action;

(b) the level of protein breakdown is determined by the ammonia content of the fermented fodder and (c) the butyric acid content of the fermented fodder is determined by titration by the methods prescribed by agricultural institutes of investigation and research.

These three criteria were used in the following Table 2 to assess the success of conversion into silage, in a comparative experiment carried out using meadow grass.

tory action on the natural fermentation flora. This is described in the article by Beck and Gross, 1973, Das wirtschaftseigene Futter, 19, 282–289.

This confirms the results of microbiological investigations according to which a marked synergistic effect in the sense of promoting the desired fermentation processes is produced by a combination of high formate content with low HMT content.

(c) Although a combination of formate with nitrite containing a smaller proportion of formate is similar in effect to the corresponding combination with HMT, no further improvement is obtained by increasing the proportion of formate. This means that in this mixture, nitrite is practically the only effective component, a conclusion which is confirmed if one compares the results with those obtained with sodium nitrite alone. The mixture of active ingredients according to the invention has, however, the great advantae of not containing nitrite, which is a powerful cytotoxin. Comparative tests led Wieringa to the same conclusions as described in Das wirtschaftseigene Futter 13, 1976, 146–151).

It is not known what factor in cell metabolism forms the basis of this selective synergistic action of formates and nitrite on the microflora of fermenting fodder. What is certain is that during the fermentation process small quantities of formaldehyde are continuously released from hexamethylene tetramine due to lowering of pH, and this process of formaldehyde release appears to be promoted by the presence of formate. A similar effect could in principle also be obtained with other active substances which release aldehydes only slowly Table 2

| Experiment | Active ingredients added: Ca formate | HMT | Na nitrite | $CO_2$ g/100 g TS | $NH_3$% | Butyric acid % by weight |
|---|---|---|---|---|---|---|
| 9 | — | — | — | 12.3 | 0.27 | 1.19 |
| 10 | 0.15 | — | — | 11.9 | 0.27 | 1.02 |
| 11 | 0.25 | — | — | 9.4 | 0.24 | 0.70 |
| 12 | — | 0.05 | — | 8.9 | 0.21+ | 0.58 |
| 13 | — | — | 0.08 | 5.2 | 0.13 | 0.22 |
| 14 | 0.15 | — | 0.08 | 5.0 | 0.11 | 0.23 |
| 15 | 0.25 | — | 0.08 | 4.9 | 0.12 | 0.20 |
| 16 | 0.15 | 0.05 | — | 5.5 | 0.13+ | 0.28 |
| 17 | 0.25 | 0.05 | — | 3.7 | 0.07+ | 0.01 |
| 18 | 0.25 | 0.025 | — | 3.8 | 0.07+ | 0.03 |

+$NH_3$ due to HMT was substracted
TS = dry substance

This table shows that:

(a) Each individual component of the mixture of ensiling agents according to the invention is insufficiently effective on its own.

(b) When combinations of formate and HMT are used, a particularly high quality of silage with little loss by fermentation gas is obtained if the mixture contains a very small proportion of HMT and the proportion of formate is increased to an amount corresponding to about 0.25% by weight in the fodder. This advantageous effect of the combination of HMT and a higher proportion of formate can be seen from the figures in the table for the variation where the agent consists of 0.25% formate and 0.025% HMT. The analytical results differ only slightly from those obtained for the variation containing twice the proportion of HMT. This finding has an important bearing on the physiological harmlessness and freedom from residue of mature silage. It has recently been found that complete microbial degradation of the formaldehyde in silage occurs only if the original formaldehyde content is not higher than about 0.1% by weight and does not have a persistent inhibiunder these conditions, but hexamethylene tetramine is preferred because it is cheap and harmless.

In order to improve the pourability of the mixture and its storage stability, it may be advisable to add carriers which have no harmful effect on the silage material or even improve its feed value. These carrier substances may also improve the handling properties of the ensiling agent. As the quantity of substances added increases, so they can be more easily uniformly distributed in the silage fodder, particularly in green fodder, particularly if the additives also improve the pourability of the ensiling agent. Examples of suitable carriers include crude phosphate, bone meal, tricalcium phosphate, bole, talcum, stearates of alkaline earth metals, sodium chloride, rock salt or other minerals suitable for feeding.

The ensiling agent according to the invention can easily be scattered or sprayed for use and dosed and can be used safely with little expenditure on labour or apparatus since even very small quantities reliably produce the desired effect.

When the silages are used as feedstuffs, no harmful dietary effects or side effects need be feared from the added preservatives, for the following reasons:

(a) As biogenic compounds, the formates are physiologically completely harmless at the concentrations employed;

(b) When hexamethylene tetramine is added at concentrations of up to 0.1% to the material which is to be ensiled, it is almost completely broken down within a few weeks by liberation of ammonia and formaldehyde. Experimental findings confirm this as described in the article by Dr. Beck and Dr. Gross: 1973, "Das wirtschaftseigene Futter" 19, 282-289.

(c) When nitrites are added according to the particular embodiment of the invention, they are present in such small quantities that they are completely decomposed within a few days of the onset of fermentation.

The percentages given in this description are percentages by weight unless otherwise indicated. The quantities relate to calcium formate and HMT. If other components are used, they should be used in the corresponding equivalent quantities.

EXAMPLE 1

For ensiling 100 m$^3$ = 70 tonnes of alfalfa, 0.3% – 210 kg of a mixture of 85% calcium formate and 15% hexamethylene tetramine were added by hand or continuously with the aid of a commercial dosing apparatus for pulverulent ensiling agent. This corresponded to the addition of 0.255% of calcium formate and 0.045% of HMT, based on the weight of green fodder.

EXAMPLE 2

For ensiling 200 m$^3$ = 120 tonnes of grass, 0.2% = 240 kg of a mixture of 80% calcium formate and 20% hexamethylene tetramine were added continuously from a commercial dosing apparatus during harvesting with the loading truck. This addition corresponded to 0.6% of calcium formate and 0.04% HMT, based on the weight of green fodder.

EXAMPLE 3

When ensiling 400 m$^3$ = 240 tonnes of silo maize, a total of 0.2% = 480 kg of a mixture of 60% of calcium formate, 15% of hexamethylene tetramine and 25% of crude phosphate as carrier was added continuously with the aid of a commercial dosing apparatus during harvesting with a chaff cutter or when filling the silos by means of a conveyor belt or blower. Based on the weight of green fodder, this corresponded to the addition of 0.12% of calcium formate and 0.03% of HMT.

What we claim is:

1. An ensiling agent which contains, based on the total quantity of active ingredients, a mixture of from 50 to 90% by weight of salts of formic acid and from 10 to 50% by weight of hexamethylene tetramine.

2. An ensiling agent as claimed in claim 1 in which the salt of formic acid is calcium formate.

3. An ensiling agent as claimed in claim 1 which also contains a carrier selected from the group consisting of crude phosphate, bone meal, tricalcium phosphate, bole, talcum, a stearate of an alkaline earth metal, sodium chloride or rock salt.

4. A process for the fermentation of fodder plants which comprises:

adding from 0.1 to 0.5% by weight of an ensiling agent which contains a mixture of from 50–90% by weight of salts of formic acid and from 10 to 50% by weight of hexamethylene tetramine, based on the weight of green fodder, to the material which is to be ensiled, the amount of hexamethylene tetramine not exceeding 0.1% by weight based on the weight of green fodder.

5. A process as claimed in claim 4 in which the concentration of salt of formic acid is from 0.1 to 0.3% by weight, based on the weight of green fodder.

6. A process as claimed in claim 4 in which the concentration of hexamethylene tetramine is from 0.01 to 0.1% by weight, based on the weight of green fodder.

7. A process as claimed in claim 6 in which the concentration of hexamethylene tetramine is from 0.02 to 0.08% by weight, based on the weight of green fodder.

8. Silage which has been produced by a fermentation process as claimed in claim 4.

* * * * *